United States Patent
Sabotta et al.

(10) Patent No.: US 6,205,500 B1
(45) Date of Patent: *Mar. 20, 2001

(54) SYSTEM AND METHOD FOR ELECTRICALLY ISOLATING A DEVICE FROM HIGHER VOLTAGE DEVICES

(75) Inventors: Michael L. Sabotta; Thomas W. Grieff, both of Harris County, TX (US)

(73) Assignee: Compaq Computer Corp., Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/936,208

(22) Filed: Sep. 24, 1997

(51) Int. Cl.$^7$ ..................................... G06I 13/00
(52) U.S. Cl. .......................... 710/100; 710/101; 710/102; 710/104; 710/131; 714/14; 307/75; 307/98; 257/355
(58) Field of Search ....................... 395/280; 365/185.11, 365/185.33, 189.05, 226; 364/784.02, 784.03; 710/101, 102, 104, 107, 131; 307/75, 98; 714/14; 257/355

(56) References Cited

U.S. PATENT DOCUMENTS

| | | | |
|---|---|---|---|
| 4,481,430 | * 11/1984 | Houk et al. | 307/296 |
| 4,964,011 | * 10/1990 | Sternglass | 361/88 |
| 5,229,652 | 7/1993 | Hough | 307/104 |
| 5,265,211 | * 11/1993 | Amini et al. | 710/107 |
| 5,301,287 | * 4/1994 | Herrel et al. | 711/202 |
| 5,317,721 | * 5/1994 | Robinson | 395/500 |
| 5,365,181 | * 11/1994 | Mair | 327/116 |
| 5,467,453 | * 11/1995 | Kocis | 710/101 |
| 5,493,534 | * 2/1996 | Mok | 365/226 |
| 5,546,042 | * 8/1996 | Tedrow et al. | 327/538 |
| 5,557,758 | * 9/1996 | Bland et al. | 710/128 |
| 5,559,966 | * 9/1996 | Cho et al. | 710/105 |

(List continued on next page.)

FOREIGN PATENT DOCUMENTS

| 674274A1 | 9/1995 | (GB) . |
|---|---|---|
| 788058A1 | 8/1997 | (GB) . |

OTHER PUBLICATIONS

European Search Report regarding Application No. 98307413.9 dated Aug. 1, 1999.

*Primary Examiner*—Ayaz R. Sheikh
*Assistant Examiner*—Frantz Jean
(74) *Attorney, Agent, or Firm*—Akin, Gump, Strauss, Hauer & Feld, LLP

(57) ABSTRACT

An isolation system and method that electrically couples a device to a bus during cycles associated with or accessing the device, but otherwise isolates the device from the bus. The isolation system includes an isolation device coupled to the device and to the bus that includes an enable input adapted to receive an enable signal, where the isolation device electrically couples the device to said bus while the enable signal is asserted, but otherwise electrically isolates the device from the bus. The isolation system further includes enable logic that detects cycles on the bus and provides the enable signal to the enable input of the isolation device during a cycle if the cycle is associated with the device. The isolation device may comprise a bus switch, one or more discrete isolating devices such as bipolar transistors, field-effect transistors, or any other suitable device for isolating a device from the bus. Generally, the enable logic may comprise decode logic that decodes an address on the bus during the bus cycle to determine if the address corresponds to an address of the device. Decode logic is useful for decoding a memory cycle on the bus for accessing a low voltage memory device, which is otherwise isolated from the bus.

20 Claims, 5 Drawing Sheets

U.S. PATENT DOCUMENTS

| | | | | |
|---|---|---|---|---|
| 5,561,384 | * | 10/1996 | Reents et al. | 327/108 |
| 5,563,838 | * | 10/1996 | Mart et al. | 365/226 |
| 5,572,663 | * | 11/1996 | Hosaka | 714/12 |
| 5,596,708 | * | 1/1997 | Weber | 714/6 |
| 5,625,593 | * | 4/1997 | Kimura | 365/189.05 |
| 5,636,288 | * | 6/1997 | Bonneville et al. | 381/110 |
| 5,671,179 | * | 9/1997 | Javanifard | 365/185.33 |
| 5,680,063 | * | 10/1997 | Ludwig et al. | 326/80 |
| 5,796,992 | * | 8/1998 | Reif et al. | 395/555 |
| 5,822,512 | * | 10/1998 | Goodrum et al. | 714/14 |
| 5,822,547 | * | 10/1998 | Boesch et al. | 710/103 |
| 5,828,600 | * | 10/1998 | Kato et al. | 365/185.11 |
| 5,938,751 | * | 8/1999 | Tavallaei et al. | 710/103 |
| 5,943,482 | * | 8/1999 | Culley et al. | 710/103 |
| 5,945,713 | * | 8/1999 | Voldman | 257/355 |

* cited by examiner

SYSTEM AND METHOD FOR ELECTRICALLY ISOLATING A DEVICE FROM HIGHER VOLTAGE DEVICES

FIELD OF THE INVENTION

The present invention relates to a system and method for electrically isolating a device from a conmnon bus, and more particularly to a method and apparatus for utilizing decode logic and a switching device to electrically isolate a device from higher voltage devices sharing a common bus.

DESCRIPTION OF THE RELATED ART

Many electronic devices, including computers systems and peripherals, are based on the conventional five volt transistor-transistor logic (TTL) standard. For example, many computer systems include one or more processors, support logic, controllers and memory devices coupled to a common bus, where all of the devices operate based on the 5 volt TTL standard. In this 5 volt environment, communication between the various devices sharing the common bus was not a problem since all of the components and devices were designed to operate at 5 volts. There has been a move toward power conservation, however, that has driven manufacturers to produce memory devices and processors that operate at lower voltage levels, such as 3.3 volts. In laptop computers, for example, power conservation is essential to prolong the life of rechargeable batteries. This is also true for many peripheral or expansion devices of larger computer systems, where it is desired to reduce power consumption to reduce the strain on the peripheral or expansion bus. In spite of the trend towards reducing energy consumption, many devices and components still operate at higher voltage levels to obtain necessary high performance levels. Higher voltage levels often allow faster logic transitions and corresponding reduced latency to improve timing and performance.

A hybrid system combining lower and higher voltage devices may present problems for computer system designers. Some devices are designed to operate at lower voltage logic levels but are tolerant to higher voltage levels. For example, several processor manufacturers have begun producing processors for all types of computer systems that operate at 3.3 volts, but are 5 volt tolerant. This allows both 5 and 3.3 volt devices to safely communicate with the processor over a common bus. Some devices, however, operate at lower voltage levels and are sensitive to higher voltage levels. For example, some 3.3 memory devices are not 5 volt tolerant and thus are not capable of operating on the same bus as 5 volt devices, since otherwise the higher voltage levels would destroy part or all of the memory. Thus, when a 5 volt device accesses the conmnon bus, the 3.3 volt memory device could be damaged because of the excessive power dissipation output onto the bus by the 5 volt devices, Thus, the need exists for a way of isolating devices from a bus shared by higher voltage devices but still allowing the lower voltage devices to communicate with a lower voltage processor.

SUMMARY OF THE INVENTION

An isolation system and method according to the present invention electrically couples a device to a bus during access of that device, but otherwise isolates the device from the bus. The isolation system includes an isolation device coupled to a low voltage device and to the bus that includes an enable input adapted to receive an enable signal, where the isolation device electrically couples the device to said bus while the enable signal is asserted, but otherwise electrically isolates said device from the bus. The isolation system flrther includes enable logic that detects cycles on the bus and provides the enable signal to the enable input of the isolation device during a cycle if the cycle is intended for the device. The isolation device may comprise a bus switch, one or more discrete isolating devices such as bipolar transistors, field-effect transistors, or any other suitable device for isolating a device from the bus. Generally, the enable logic may comprise decode logic that decodes an address on the bus during an access cycle to determine if the address corresponds to an address of the lower voltage device. In an embodiment described herein, the low voltage device is a low voltage memory device that is coupled to the bus via the isolation device only during memory cycles executed on the bus to access the memory device.

The switching device may include a first set of contacts coupled to the bus and a second set of contacts coupled to corresponding signal contacts of the low voltage device. The switching device electrically isolates the low voltage device from the bus by electrically isolating its first set of contacts from its second sets of contacts. Upon receiving the enable signal, the switching device electrically couples the low voltage device to the bus. In particular, when the switching device receives the enable signal, it transitions from an open position, high impedance state to a closed, low impedance state, which directly couples signal lines of the bus to corresponding signal contacts of the low voltage device.

A processor is typically the device that executes cycles on the bus and asserts addresses corresponding to the low voltage device for accessing that device. The processor generally operates at the same low voltage as the low voltage device, but is tolerant to higher voltage levels of other devices on the bus. Thus, the processor may communicate with various other higher voltage devices coupled to the bus while the low voltage device is isolated. For a low voltage memory device, the processor generally executes either read or write cycles and asserts an address onto the bus corresponding to or associated with the memory device. Typically, the memory device has a predetermined set of addresses or an address range for addressing the memory. Decode logic coupled to the bus decodes an address asserted on the bus during a memory cycle to determine whether the address is within the predetermined address range of the memory device. The decode logic thus detects the memory cycle, decodes the address and asserts the enable signal to the switching device if the address indicates the memory device. In this manner, the processor reads data from or writes data to the memory device while coupled to the bus via the switching device.

During communication between the processor and the low voltage device, the other higher voltage devices coupled to the bus are either in a high impedance state or are otherwise isolated from the bus to electrically isolate the low voltage device from the higher voltage levels.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
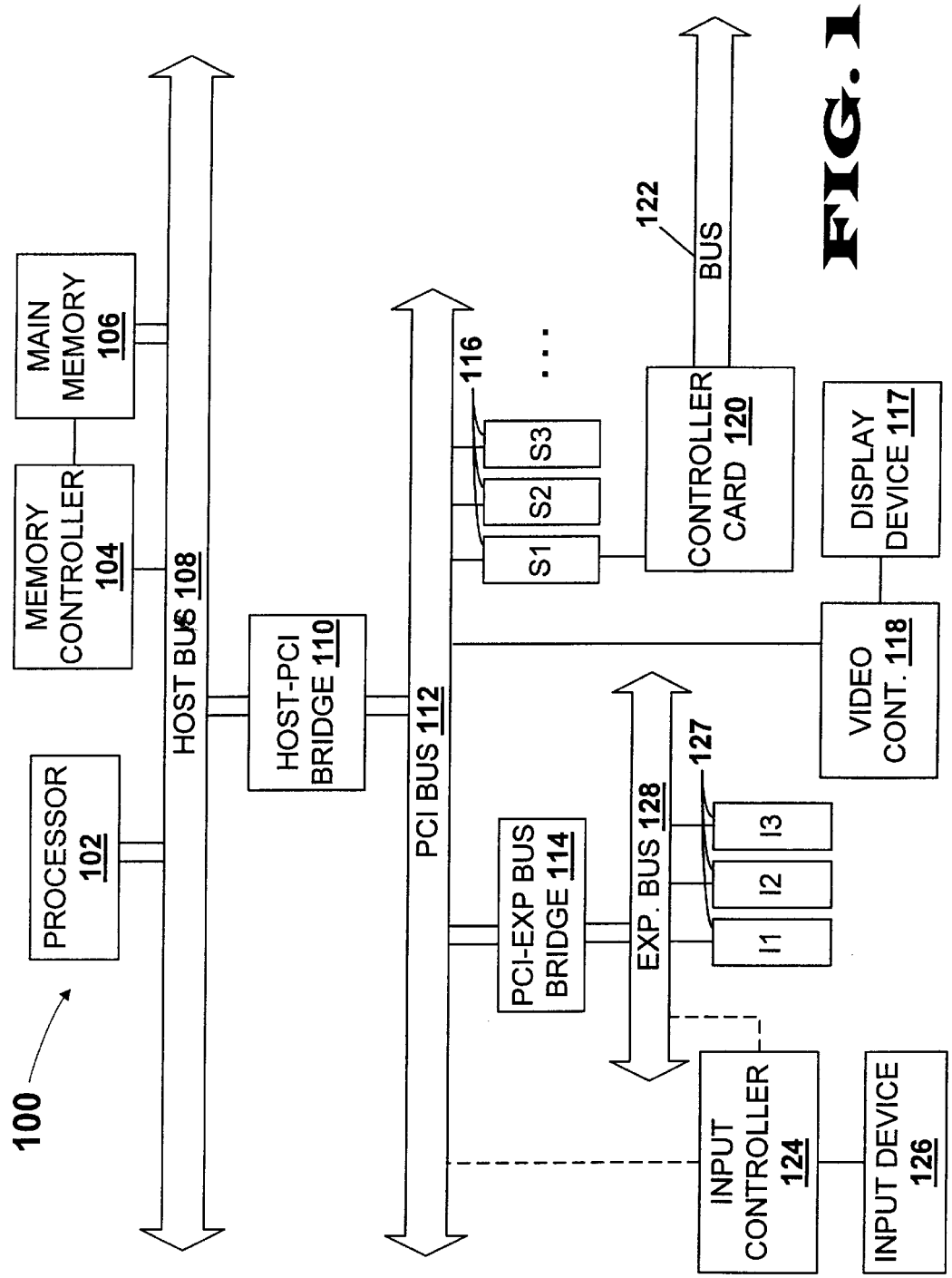
FIG. 1 is a block diagram of an embodiment of a computer system used in conjunction with an isolation system implemented according to the present invention.

Referring now to FIG. 1, a block diagram is shown of a computer system 100 used in conjunction with an isolation system according to the present invention. The computer system 100 is an IBM-compatible, personal computer (PC) system or the like typically used for workstations or server systems. The computer system 100 includes a host bus 108 coupled to at least one central processing unit (CPU) identified as main processor 102. Processor 102 preferably includes any one of several microprocessors and supporting external circuitry typically used in PCs, such as the 80386, 80486, Pentium™, Pentium II™, etc. microprocessors from Intel Corp., where the external circuitry preferably includes an external or level two (L2) cache or the like (not shown). Although the present invention is illustrated with an IBM-compatible type PC system, it is understood that the present invention is applicable to other types of computer systems and processors as known to those skilled in the art.

A memory controller 104 is coupled to the host bus 108 and to the main memory 106 to receive and control main memory operations. The main memory 106 is coupled to the host bus 108 via buffers (not shown) for data transfer. The main memory 106 is preferably implemented with one or more memory boards plugged into compatible memory slots on the motherboard, although any main memory configuration is contemplated. The computer system 100 includes a PCI bus 112 coupled to the host bus 108 via a Host-PCI bridge 110, which handles translation of signals between the host bus 108 and the PCI bus 112. The PCI bus 112 is typically implemented with one or more PCI slots 116, individually labeled S1, S2, S3 and so on, where each of the PCI slots 116 are configured to receive compatible PCI adapter cards incorporating one or more PCI devices as known to those skilled in the art. Typical PCI devices include network interface cards (NICs) disk controllers such as a SCSI (Small Computer System Interface) disk controller, video or graphics controllers, etc.

Figure 2:
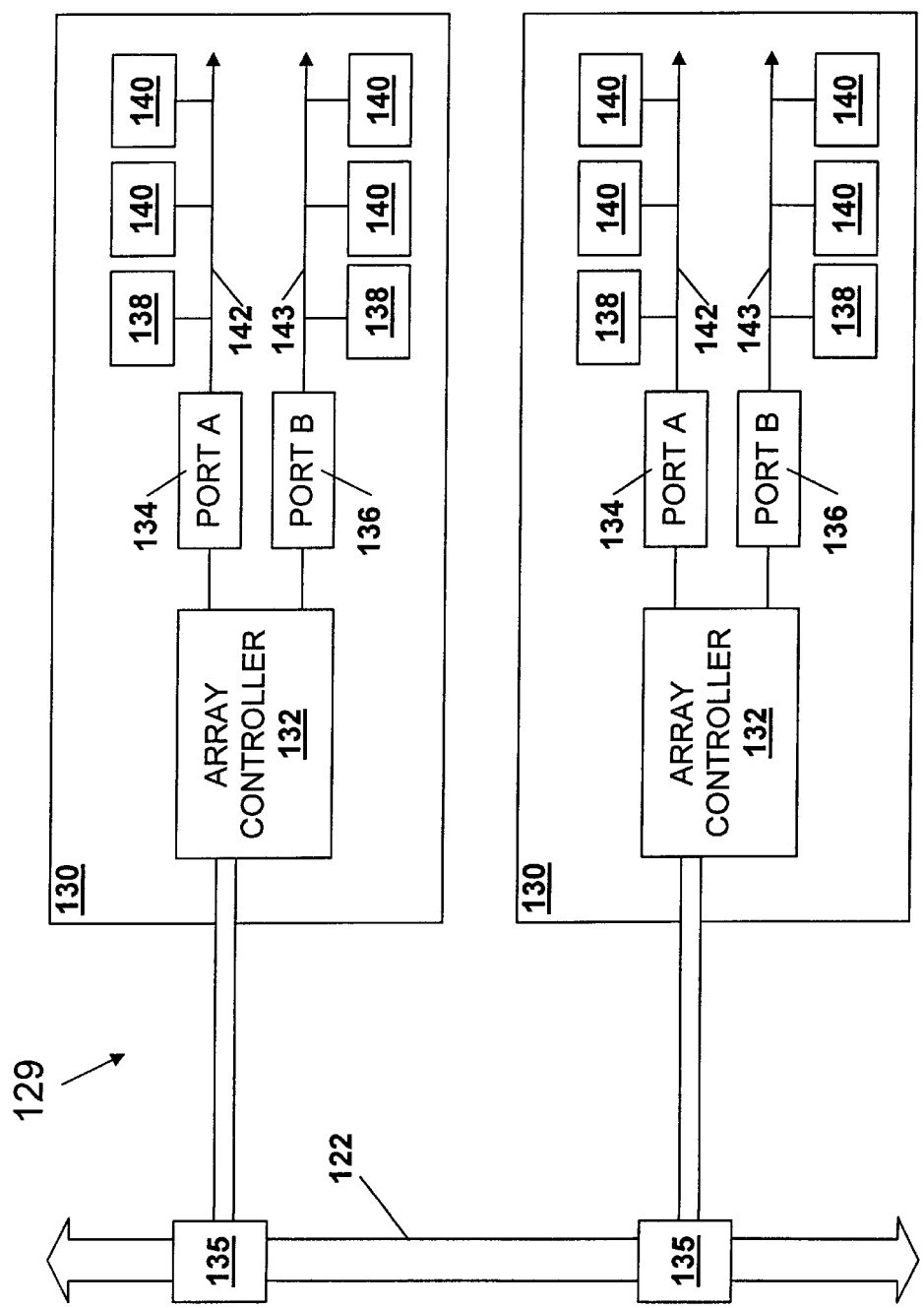
FIG. 2 is a block diagram depiction of a disk drive subsystem including one or more array controllers implemented according to the present invention and used in conjunction with the computer system of FIG. 1.

As an example, in one embodiment, the isolation system according to the present invention is used within an array controller, such as each array controller 132 of FIG. 2. It should be understood that the present isolation system could otherwise be carried out in any system which includes a low voltage device and other devices that operate at a voltage that is higher than the. maximum operating voltage of the low voltage device, so that it is desired to isolate the low voltage device. In this array controller example, a controller card 120 is used to interface between the system PCI bus 112 and an array controller 132. The controller card 120 is fashioned as a PCI card that is plugged into one of the PCI slots 116. The controller card 120 interfaces between the PCI bus 112 and a communication bus 122, which in one embodiment is a fiber optic cable or link. Bus 122 in turn communicates with the disk drive storage units 130 (FIG. 2). It should be understood that bus 122 need not be a fiber optic link, but instead may be any commonly used electrical conductor such as a coaxial cable, a ribbon wire cable assembly, or other similar device used to bus electrical signals between one or more points in a computer system. Bus 122 is implemented as a fiber optic link to allow for greater bandwidth between the computer system 100 and a plurality of peripheral devices, typically disk drives.

Still referring to FIG. 1, the embodiment depicted utilizes an input device 126, such as a mouse, keyboard, light pen, pointing device or any other similar type user input device known to those skilled in the art. The input device 126 is coupled to a corresponding input controller 124 which can be coupled to PCI bus 112 or is otherwise coupled to an expansion bus 128, depending on the particular system implementation. The computer system 100 also includes a display device 117, such as a monitor or the like, which is coupled to a video controller 118 which is coupled to the PCI bus 112. A configuration utility is loaded into the main memory 106 and is executed by the processor 102, which facilitates configuration of a drive array using the disk drives shown in FIG. 2.

It should be noted that the computer system 100 may be implemented in any one of many alternative manners. For example, an industry standard architecture (ISA) bus or an extended ISA (EISA) bus could be substituted for the PCI bus 112. For an EISA bus, the Host-PCI bridge 110 would be replaced by an EISA bus controller (EBC) for handling transitions of signals between the host bus 108 and an EISA bus. The PCI slots 116 are instead EISA slots for receiving EISA compatible cards, and the controller card 120 is replaced by a corresponding array controller card implemented for interfacing an EISA bus. Alternatively, the computer system 100 includes the expansion bus 128 coupled to the primary PCI bus 112 through a PCI-expansion bus bridge 114. The expansion bus 114 is any one of many different types, including another PCI bus, an ISA bus, an EISA bus or the microchannel architecture (MCA) bus, among others. For an EISA bus, the PCI-expansion bus bridge 114 is a PCI-EISA bridge. The expansion bus 128 preferably includes one or more expansion or input/output (I/O) slots 127, individually labeled I1, 12, 13, etc. An array controller configured for plugging into one of the slots 127 and for interfacing the expansion bus 128 could be used instead of the controller card 120, where such controller card would interface with bus 122.

Other components, devices and circuitry are normally included in the computer system 100, though not shown, are known in the art. Such other components, devices and circuitry are coupled to the host bus 108, the PCI bus 112, the expansion bus 128 or other input/output (I/O) buses (not shown) that may be included. For example, the computer system 100 may include an integrated system peripheral (ISP), an interrupt controller such as an advanced programmable interrupt controller (APIC) or the like, arbiter(s), a system ROM (read only memory) comprising one or more ROM modules, a keyboard controller, a real time clock (RTC) and timers, communication ports, non-volatile static random access memory (NVSRAM), a direct memory access (DMA) system, diagnostics ports, command/status registers, battery-backed CMOS memory, etc.

Referring now to FIG. 2, the bus 122 couples the controller card 120 with a plurality of disk drive storage units 130 of a disk drive subsystem 129. Each disk drive storage unit 130 connects to bus 122 with a connector 135, which is a fiber optic connector if bus 122 is a fiber optic bus and is an electrical connector if bus 122 includes electrical signal conductors. Each disk drive storage unit 130 is physically a self-contained storage box that includes a backplane bus, which fierier includes SCSI buses 142, 143, although a single backplane SCSI bus is contemplated as well. Disk drive storage unit 130 also includes an array controller 132 which interfaces between bus 122 and SCSI ports A and B, 134 and 136, respectively. Each SCSI port 134, 136 is coupled to a unique SCSI bus 142, 143, respectively. In another embodiment, a single SCSI port and a single SCSI bus may be utilized by the disk drive storage unit 130. Coupled to each SCSI bus 142, 143 is a plurality of physical drives 140. In another embodiment, any disk controller may be used to control the plurality of disk drives in a disk drive storage unit 130, without the disk controller limited to being an array controller. Additionally, the bus 122 may be a SCSI bus connected to a plurality of drives.

The SCSI buses 142, 143 can be internal to the computer system 100 as desired rather than being provided in a separate drive subsystem 129. The array controller 132 and the disk drives 140 may be implemented according to SCSI-1 (ANSI X3.131-1986), SCSI-2 (ANSI X3.131-1994) including Fast SCSI, Wide SCSI-2 and Fast Wide SCSI or SCSI-3, which includes a plurality or family of standards including Fast-20 SCSI, Ultra SCSI, DoubleSpeed SCSI, etc. The array controller 132 and the drives 140 may alternatively be implemented according to any one of several disk drive implementations, such as the Integrated Drive Electronics (IDE), the AT Attachment (ATA) or ATA-2 or ATA-3, the enhanced-IDE (EIDE), the ATA Packet Interface (ATAPI), etc. The SCSI array controller 132 for each disk drive storage unit 130 operates the various attached SCSI drives 140 as an array of drives, preferably implementing striping and fault tolerant techniques such as RAID levels 1–5. A separate indicator light controller 138 is coupled to each of the SCSI buses 142, 143 for controlling indicator lights (not shown) representing status of each of the disk drives 140.

Figure 3:
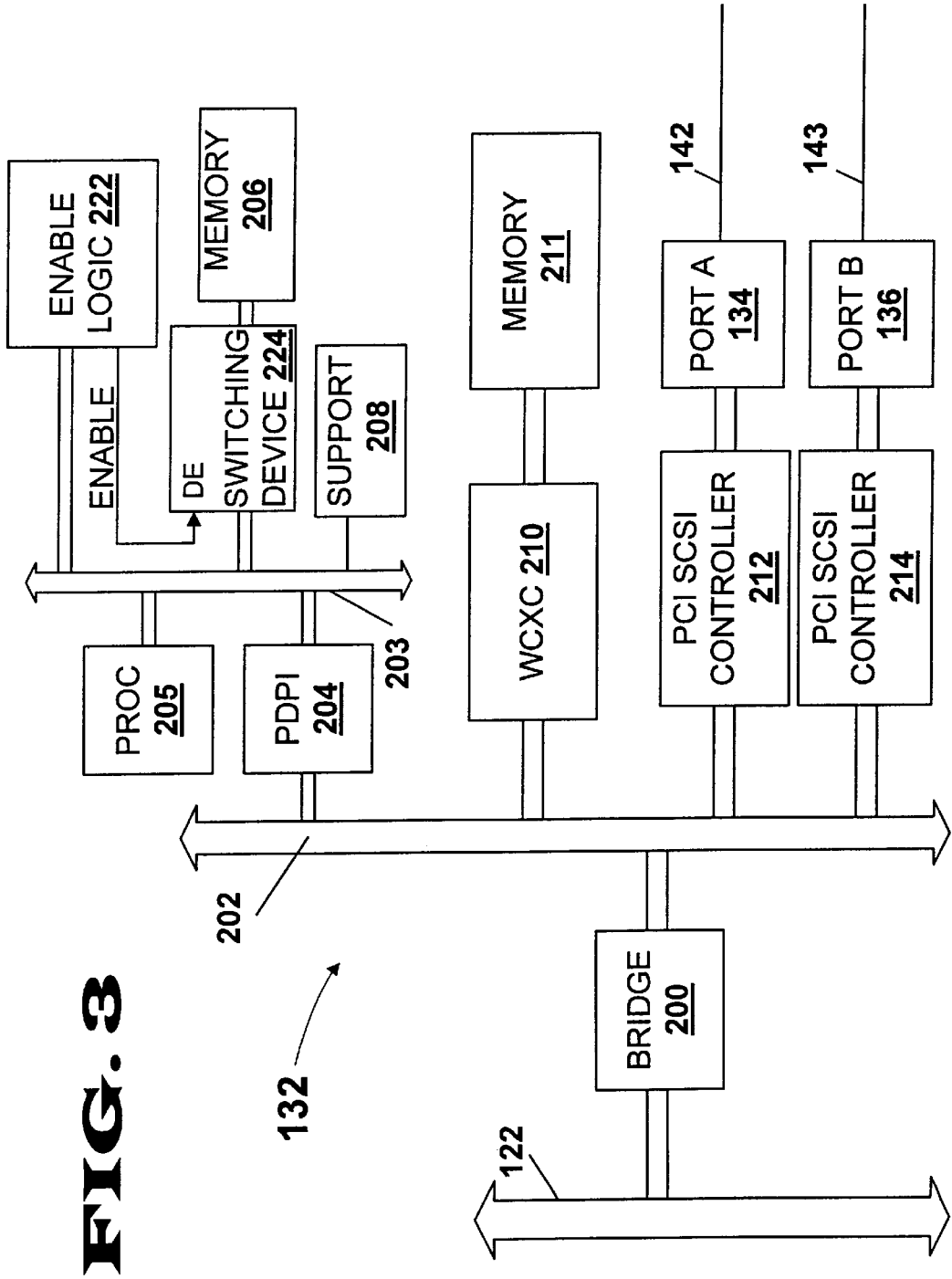
FIG. 3 is a block diagram of an array controller of FIG. 2 that includes an isolation system implemented according to the present invention for isolating a low voltage memory device.

Referring now to FIG. 3, a block diagram is shown of each array controller 132. A bridge 200 is provided for interfacing the bus 122 to a local bus 202, which is preferably a PCI local bus. The specific configuration of the bridge 200 depends upon the types of buses 122 and 202. Assuming that the bus 202 is a local PCI bus, then the bridge 200 is either an EISA to PCI bridge, a PCI to PCI bridge, a fiber optic to PCI bridge, etc. A PCI memory controller and XOR engine (WCXC) 210 is coupled between the PCI local bus 202 and a memory 211. The memory 211 preferably comprises dynamic RAM (DRAM) and includes a transfer buffer for temporary storage of disk data and/or command packets. For example, data read from any of the disk drives 140 may be temporarily stored within the memory 211 before being transferred to the main memory 106 via the bridge 200, and data to be written to the disk drives 140 from the main memory 106 may be temporarily stored in the memory 211. The memory 211 may further include cache memory and functions, battery backed, parity checked and mirrored memory for posted writes to the disk drives 140. The PCI local bus 202 is further coupled to two PCI SCSI controllers 212 and 214. The SCSI controller 212 is coupled to the disk drives 140 via the port 134 and the SCSI bus 142, and the SCSI controller 214 is coupled to the disk drives 140 via the port 136 and the SCSI bus 143. Any number of PCI SCSI controllers may be included for coupling to corresponding SCSI ports and buses as desired.

The array controller 132 preferably includes a local processor 205 coupled to a local processor bus 203, where the processor 205 is any type of suitable processor, such as the 29040 32-bit RISC processor by Advanced Micro Devices, Inc. (AMD). The processor 205 preferably operates at a low logic voltage level, such as 3.3 volts in the embodiment shown, but is tolerant to higher logic voltage levels, such as five (5) volt devices. A local processor interface (PDPI) 204 is coupled between the PCI local bus 202 and the bus 203 for interfacing the processor 205 to the PCI local bus 202. The processor 205 provides the main control for the array controller 132 for controlling configuration, data transfer, data organization, etc. The processor 205 is coupled to a local memory 206 and processor support circuitry 208 via the bus 203.

The support circuitry 208 includes logic for providing support functionality for the processor 205, such as timers and interrupt controllers or the like. The support circuitry 208 includes at least one 5 volt device and the PDPI device 204 operates at 5 volts. The processor 205 is able to execute cycles on the bus 203 to access the support circuitry 208 and the PDPI device 204, since the processor 205 is 5 volt tolerant. The local memory 206 stores operating instructions for the local processor 205 and program memory for controlling operations of the processor 205. Instructions stored in the local memory 206 control the configuration and operation of the array controller 132 for storing data in and retrieving data from the disk drives 140. The memory 206, however, includes one or more 3.3 volt memory devices that are not tolerant to 5 volts. 5 volt signals applied to the memory 206 would otherwise damage or destroy the memory devices, so that the memory 206 should be isolated from the 5 volt devices accessing the bus 203. It is noted that although the present invention is illustrated using the 3.3 and 5 volt logic standards, that any two logic voltage standards are contemplated. Generally, the processor 205 operates according to the same logic voltage standard as the memory 206, but is tolerant to higher voltage devices. The higher voltage devices, however, operate at or above the maximum operating voltage of the memory 206.

In the embodiment of FIG. 3, a switching device 224 is provided to electrically isolate the memory 206 from the processor bus 203 and thus any higher voltage devices. The processor 205 executes memory cycles on the bus 203 and asserts an address to access one or more memory locations within the memory 206 when the processor 205 needs to read data ftom or write data to the memory 206. Enable logic 222 coupled to the bus 203 detects the memory cycle and provides an ENABLE signal to a device enable (DE) input of the switching device 224 if the memory cycle is intended for the memory 206. The enable logic 222 typically decodes an address asserted on the bus 203 during the memory cycle. When enabled, the switching device 224 electrically couples the memory 206 to the bus 203 so that the address is provided to the memory 206. The memory cycle includes a data portion so that data is written to or read from the memory 206. The bus 203 preferably includes address and data signals or combined address/data signals, which are coupled to corresponding address/data signals of the memory 206 when the switching device 224 is enabled.

The switching device 224 preferably includes a plurality of first contacts coupled to signal contacts of the memory 206, and a plurality of corresponding second contacts coupled to corresponding bus signal lines of the bus 203. The switching device 224 further includes a plurality of switches, each coupled between corresponding ones of the first and second contacts of the switching device 224. The switches have at least two states based on the ENABLE signal received at the enable input (DE) of the switching device 224. A first "open" state disconnects the corresponding contacts of the switch and a second, "closed" state couples or electrically connects the corresponding contacts together. The switches of the switching device 224 are implemented in any suitable manner, such as relay type devices, bipolar transistors, field-effect transistors (FETs), metal oxide semiconductor FETs (MOSFETs), etc. The switching device 224 is preferably a high speed CMOS bus switch, such as the QS32X384 bus switch manufactured by Quality Semiconductor, Inc. Alternatively, the switching device 224 is an SN74CBTS3384 10-bit bus switch manufactured by Texas Instruments, Inc. (TI).

Various methods are known for detecting a memory cycle executed by a processor. For example, the processor 205 may assert a cycle start signal along with control signals indicating the type of cycle on the bus 203. For example, an MIO signal may be provided that indicates whether the cycle is memory or input/output (I/O), and a Tead/write (R/W) signal may indicate whether the cycle is a read or write cycle, respectively. Also, the processor 205 generally asserts control signals identifing the duration of each memory cycle, such as a cycle signal that is asserted during the duration of each cycle. Any one of several methods are contemplated and depends upon the particular processor, memory and implementation.

During the memory cycle, the processor 205 asserts an address on the processor bus 203 that corresponds to the local memory 206. Typically, the memory 206 is mapped into a predetermined memory range of memory space of the processor 205. The enable logic 222 detects the memory cycle executed by the processor 205 and then decodes the address asserted on the bus 203. In particular, the enable logic 222 reads or otherwise latches the address and compares the address with the predetermined memory range. If the address indicates the memory 206, then the enable logic 222 generates or otherwise asserts the ENABLE signal. When the ENABLE signal is provided to the switching device 224, it transitions from an open or high impedance state to a closed or low impedance state, which electrically couples the signals of the memory 206 to the bus 203 to respond to the cycle executed by the processor 205. During the time the memory 206 is coupled to bus 203 via the switching device 224, the other, higher voltage devices do not assert 5 volt signals on the bus 203. For example, the 5 volt devices are placed in a high impedance or open circuited state or are otherwise temporarily disabled to prevent 5 volt signals on the bus 203. This prevents damage to the memory 206.

Figure 4:
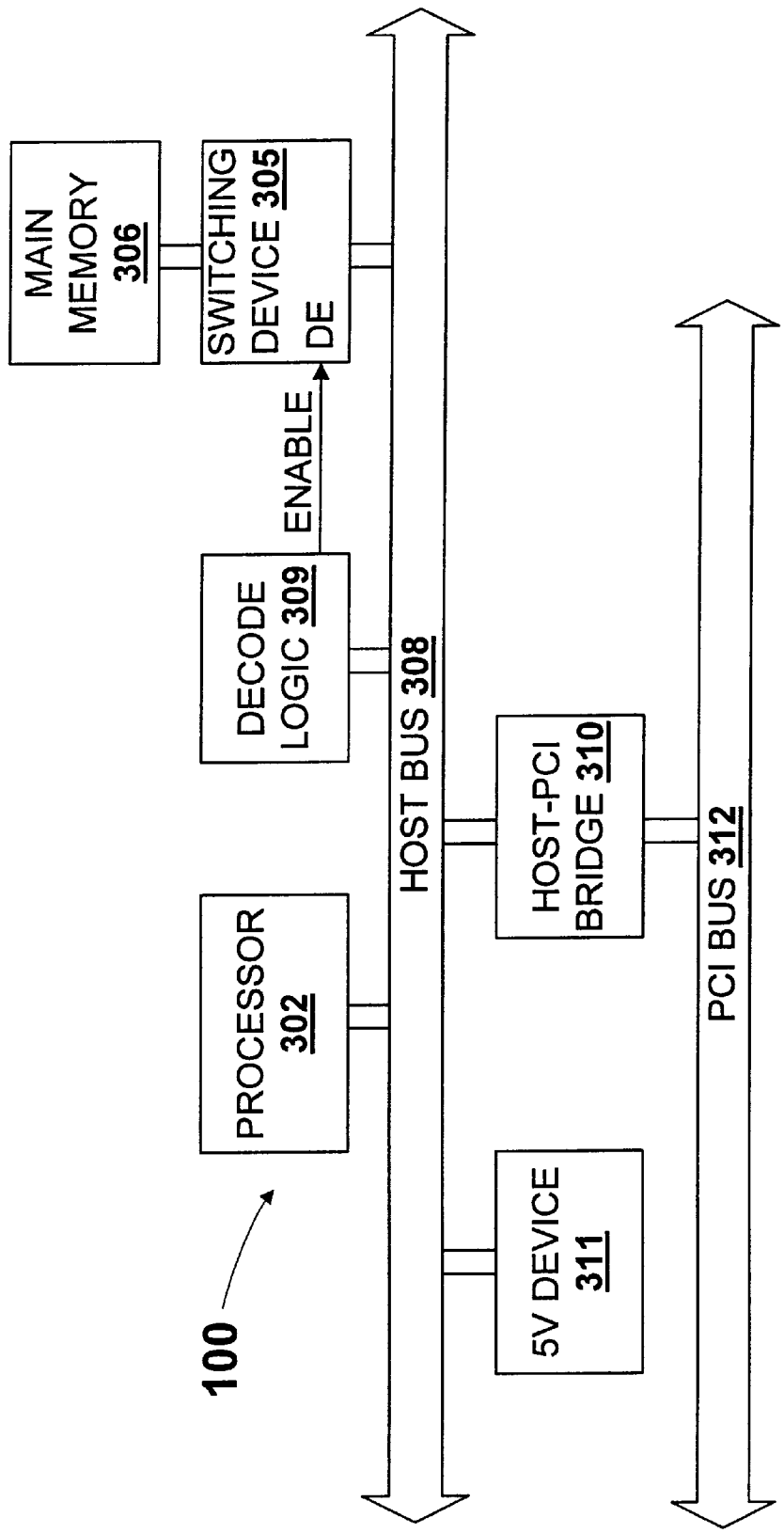
FIG. 4 is a block diagram of an embodiment of a computer system using a memory isolation system according to the present invention using a switching device coupled to a host bus for isolating the main system memory.

FIG. 4 depicts an embodiment of a memory isolation system according to the present invention used for a processor and main memory of a computer system. This embodiment, which includes a 3.3 volt main processor 302, could be used for smaller computer systems requiring energy conservation, such as laptops or portable computer systems. A main processor 302 and a 5 volt device 311 are shown coupled to a host bus 308. The main processor 302 may be any one of several microprocessors and supporting external circuitry discussed above with regard to FIG. 3. The 5 volt device 311 may be a video controller for a video display device or any other type of 5 volt device coupled to the host bus of a computer system. A host-PCI bridge 310 functions as an interface between the host bus 308 and a PCI bus 312. Decode logic 309 is coupled to host bus 308 and to a switching device 305 via a device enable (DE) input of switching device 305.

In this embodiment, the bridge 310 and the 5 volt device 311 each operate at logic voltage levels of 5 volts. Main processor 302 operates at 3.3 volts, but is 5 volt tolerant. The main memory 306, however, operates at 3.3 volts but is not 5 volt tolerant. To prevent main memory 306 from being damaged by the 5 volt devices coupled to bus 308, the switching device 305 is utilized to electrically isolate main memory 306 from host bus 308 in a similar manner as the isolation system embodiment discussed above with reference to FIG. 3. Again, the switching device 305 is preferably a high speed CMOS bus switch, such as the QS32X384 bus switch manufactured by Quality Semiconductor, Inc. Alternatively, the switching device 305 comprises relay(s), bipolar transistors, FET transistors, etc., or any other similar type electronic switches.

Again referring to FIG. 4, in operation, the main processor 302 communicates over host bus 308 with other 5 volt devices coupled to host bus 308 other than main memory 306 while the main memory 306 remains isolated via the switching device 305. Since no device ENABLE signal is present, the switching device 305 is in an open position, essentially creating an open circuit or high impedance between each signal of the main memory 306 and corresponding signals of the bus 308. This electrically isolates main memory 306 from host bus 308 and the 5 volt communication present on host bus 308, which prevents main memory 306 from being damaged by any 5 volt signals present on bus 308.

The main processor 302 executes a read or write memory cycle on bus 308 in a similar manner as described previously, and asserts an address corresponding to the memory 306. Again, the memory 306 preferably corresponds to a range of addresses. During the memory cycle, the bridge 310 and the 5 volt device 311 do not assert 5 volt signals on the host bus 308. The decode logic 309 detects the memory cycle, decodes the memory address, and if the address is within the address range for the memory 306, the decode logic 309 asserts a device ENABLE signal to a DE input of the switching device 305. The switching device 305 transitions from an open, high impedance state, to a closed, low impedance state to electrically couple the signals of the memory 306 to corresponding signals of the host bus 308.

Although illustrated using low voltage memory devices, the present invention is applicable for isolating any type of low voltage device that is coupled to a common interface with higher voltage devices, where it is desired to isolate the low voltage device from the higher voltage levels. The enable logic 222 or the decode logic 309 monitors any control, data or address signals or any combination thereof on a common interface, such as a bus or the like, to determine whether the low voltage device is being accessed.

Figure 5:
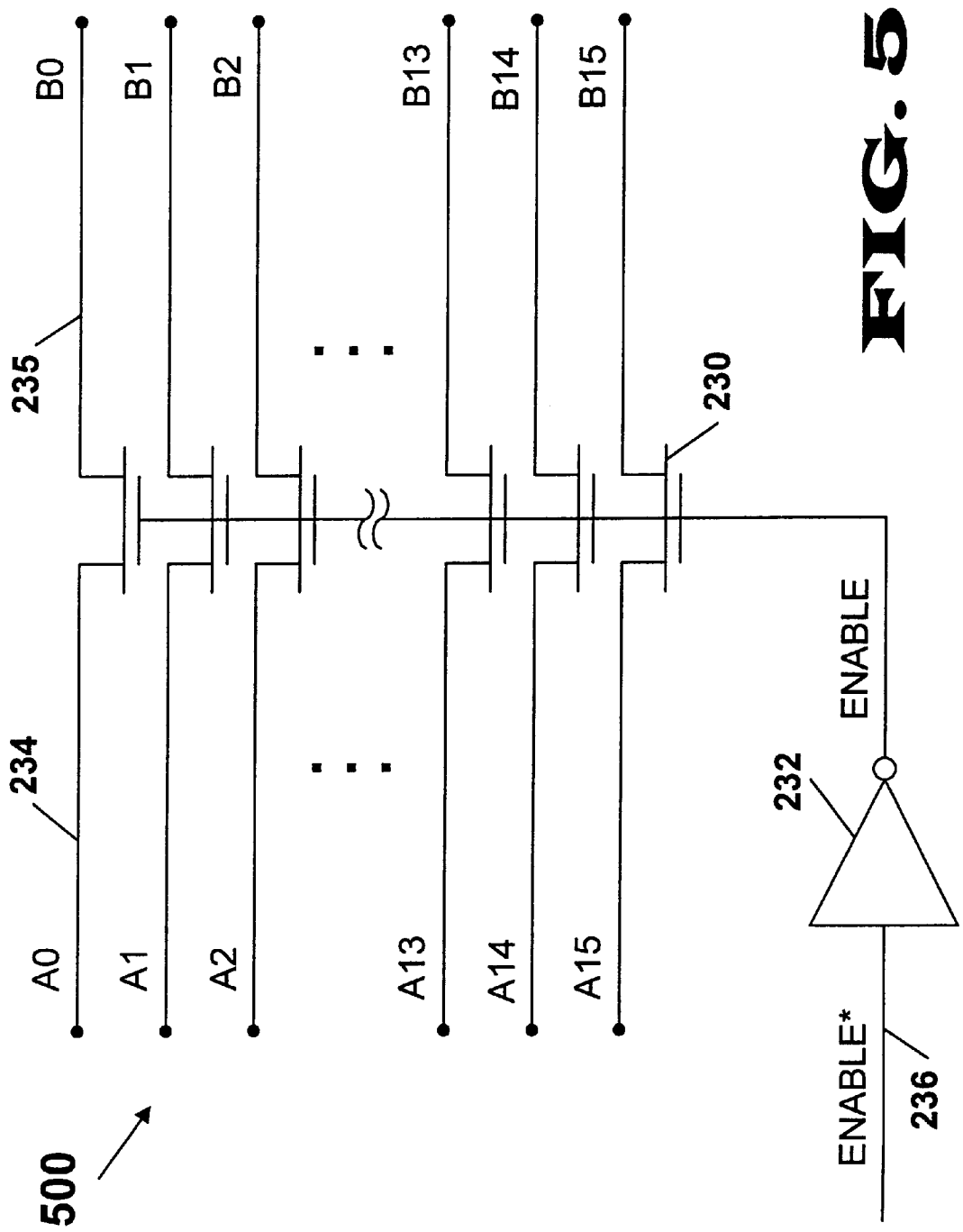
FIG. 5 is a schematic representation of an embodiment of a switching device used in an isolation system according to the present invention.

FIG. 5 is a schematic diagram of an exemplary embodiment of a switching device 500 that could be used with an isolation system according to the present invention. A plurality of individual field-effect transistor (FET) switches 230 are shown, each including drain and source terminals 234 and 235 and a gate terminal coupled to the output of a buffer inverter 232. A signal ENABLE* is provided to the input of the buffer inverter 232, where an asterisk at the end of a signal name denotes negative logic. A plurality of signals A0–A15 are provided to respective ones of the terminals 234, and a plurality of signals B0–B15 are provided to respective ones of the terminals 235 of the FET switches 230. When the ENABLE* signal is negated high, the buffer inverter 232 assert its output low turning off the FET switches 230 causing a high impedance between the terminals 234, 235. The signals A0–A15 are electrically isolated from the B0–B15 signals. When the ENABLE* signal is asserted low, the bufer inverter 232 asserts its output high turning on all of the FET switches 230. When on, a very low impedance appears across the terminals 234, 235 of each the FET switches 232, thereby electrically coupling the A0–A15 signals to the B0–B15 signals, respectively. The buffer inverter 232 provides sufficient drive current to drive the gates of all of the FET switches 230. Alternatively, a plurality of buffers may be provided for driving selected ones of the FET switches 230.

The A0–A15 signals could be corresponding address/data signals of the processor bus 203 shown in FIG. 3, where the B0–B15 signals are the corresponding address/data signals of the memory 206. Or, the A0–A15 signals could be corresponding address/data signals of the host bus 308 shown in FIG. 4, where the B0–B15 signals are the corresponding address/data signals of the main memory 306. In this manner, the terminals 234, 235 are coupled to the corresponding signals of a bus and memory device, respectively, to achieve electrical isolation and protection of the memory device from harmfuil signals of the bus. The enable or decode logic enables electrical connection when a device addresses the memory, such as a processor or the like.

It is now be appreciated that a system and method according to the present invention solves the problem of having to electrically isolate a low voltage device from higher voltage devices coupled to a common interface. The present invention was illustrated in an embodiment for a main processor and main memory having a common bus, and in another embodiment for a drive array controller. However, it is understood that the present invention may be used in any electrical device where a low voltage device shares a common interface with other devices that operate at higher voltage levels that would otherwise damage the low voltage device.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. An isolation system, comprising:
   a first device that is operable at a first voltage level;
   a bus that is operable to performs cycles at the first voltage level and a second voltage level;
   an isolation device coupled to said first device and to said bus that includes an enable input adapted to receive an enable signal, wherein said isolation device electrically couples said first device to said bus while said enable signal is asserted and the bus operates at the first voltage level, but otherwise electrically isolates said first device from said bus while said enable signal is not asserted and the bus operates at the second voltage level; and
   enable logic coupled to said bus that detects cycles on said bus, wherein said enable logic provides said enable signal to said enable input during a bus cycle if said bus cycle corresponds to said first device.

2. The isolation system of claim 1, wherein said isolation device comprises a bus switch.

3. The isolation system of claim 1, further comprising a processor coupled to said bus that executes at least one cycle on said bus to access said first device.

4. The isolation system of claim 1, wherein said isolation device is placed in a high impedance state to electrically isolate said first device from said bus.

5. The isolation system of claim 1, wherein said isolation device comprises at least one field effect transistor (FET).

6. The isolation system of claim 5, wherein said at least one FET comprises a plurality of FETs having a first set of contacts coupled to signal lines of said bus and a second set of contacts coupled to corresponding contacts of said first device and wherein each of said plurality of FETs has a control input controlled by said enable signal.

7. The isolation system of claim 1, further comprising:
   a processor coupled to said bus that executes bus cycles and asserts at least one address corresponding to said first device to access said first device.

8. The isolation system of claim 7, wherein said processor and said first device operate according to a logic standard based on approximately three volts.

9. The isolation system of claim 1, further comprising at least one device coupled to said bus that operates at a higher voltage than the maximum operating voltage of said first device.

10. A memory isolation system, comprising:
    a bus;
    a processor coupled to said bus;
    a memory device;
    a switching device coupled to said bus and to said memory device and having an enable input that receives an enable signal, wherein said switching device electrically isolates said memory device from said bus while said enable signal is not asserted and electrically couples said memory device to said bus while said enable signal is asserted;
    decode logic coupled to said bus that detects a memory cycle on said bus and that correspondingly asserts said enable signal during said memory cycle;
    the bus operates at a first voltage level when the memory device and the bus are electrically coupled; and
    the bus is operates at a second voltage level when the memory device and the bus are electrically isolated.

11. The memory isolation system of claim 10, further comprising:
    said memory device having a set of signal contacts; and
    said switching device including a first set of contacts coupled to signal lines of said bus and a second set of contacts coupled to said signal contacts of said memory device.

12. The memory isolation system of claim 11, wherein said switching device comprises a plurality of field effect transistors (FETs), each having first and second controlled terminals forming said first and second contacts, respectively, and each having a control input that receives said enable signal.

13. The memory isolation system of claim 10, wherein said memory device and said processor each operate in accordance with a logic standard based on approximately three volts.

14. The memory isolation system of claim 10, further comprising at least one device coupled to said bus that operates at a higher voltage level than the maximum operating voltage of said memory device.

15. The computer system of claim 10, wherein said switching device is placed in a high impedance state while said enable signal is not asserted to electrically isolate said memory device from said bus.

16. The computer system of claim 10, further comprising:
    said memory device having a predetermined range of addresses;

said processor asserting an address on said bus within said predetermined range of addresses during a memory cycle to access said memory device; and said decode logic further decoding said address asserted on said bus to determrine if said address is within said predetermined range of addresses.

17. A method of electrically coupling an electronic device to a bus while the device is being accessed but otherwise electrically isolating the device from the bus, comprising steps of:

electrically isolating the electronic device from the bus, the electronic device is operable at a first voltage level, the bus is operable to performs cycles at the first voltage level and a second voltage level;

detecting a cycle on the bus associated with the electronic device; and electrically coupling the electronic device to the bus during the cycle if the cycle is associated with the electronic device and the bus performs the cycle at the first voltage level.

18. The method of claim 17, further comprising a step of a processing device asserting an address on the bus to access the electronic device.

19. The method of claim 17, wherein said step of electrically isolating comprises the steps of:

providing a switching device between the signal contact of the electronic device and corresponding bus signal lines of the bus;

placing the switching device in a high impedent state bearing normal operation to isolate the electronic device from the bus; and placing the switching device in a closed state to electrically couple the electronic device to the bus during a cycle associated with the electronic device.

20. The method of claim 17, further comprising a step of:

isolating any devices coupled to the bus and operating at a higher voltage than the maximum operating voltage of the electronic device from the bus during cycles associated with the electronic device.

* * * * *